United States Patent
Bae et al.

(10) Patent No.: US 9,509,401 B2
(45) Date of Patent: Nov. 29, 2016

(54) VISIBLE LIGHT COMMUNICATION METHOD IN AN INFORMATION DISPLAY DEVICE HAVING AN LED BACKLIGHT UNIT, AND INFORMATION DISPLAY DEVICE FOR THE METHOD

(75) Inventors: Tae-Han Bae, Seoul (KR); Sun-Gi Gu, Gyeonggi-do (KR); Jae-Seung Son, Gyeonggi-do (KR); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 125 days.

(21) Appl. No.: 14/009,988

(22) PCT Filed: Jul. 17, 2012

(86) PCT No.: PCT/KR2012/005699
§ 371 (c)(1),
(2), (4) Date: Oct. 4, 2013

(87) PCT Pub. No.: WO2013/015554
PCT Pub. Date: Jan. 31, 2013

(65) Prior Publication Data
US 2014/0023378 A1  Jan. 23, 2014

(30) Foreign Application Priority Data
Jul. 28, 2011 (KR) .................. 10-2011-0075486

(51) Int. Cl.
*H04B 10/00* (2013.01)
*H04B 10/114* (2013.01)
*G06Q 30/02* (2012.01)

(52) U.S. Cl.
CPC .......... *H04B 10/1143* (2013.01); *G06Q 30/02* (2013.01); *H04B 10/114* (2013.01)

(58) Field of Classification Search
CPC ............. H04N 5/4403; H04N 21/235; H04N 21/4722; H04N 21/4126; H04N 21/4348; H04N 21/435; H04N 21/23614; G06F 3/0386; H04B 10/1143; H04B 10/116; H04B 10/114; G06Q 30/02
USPC ......... 386/241, 248; 348/441; 398/118, 128, 398/130
See application file for complete search history.

(56) References Cited

U.S. PATENT DOCUMENTS

| 2009/0002265 | A1 | 1/2009 | Kitaoka et al. |
| 2009/0175594 | A1* | 7/2009 | Ann ................ H04N 7/025 386/357 |
| 2010/0092152 | A1* | 4/2010 | Son et al. ................ 386/95 |
| 2011/0029385 | A1* | 2/2011 | Engel ................ G06Q 30/02 705/14.53 |
| 2011/0063510 | A1* | 3/2011 | Lee ................ G02F 1/133605 348/563 |

FOREIGN PATENT DOCUMENTS

| KR | 1020030045494 | 6/2003 |
| KR | 1020100040271 | 4/2010 |
| KR | 1020110029733 | 3/2011 |
| WO | WO 2006/011515 | 2/2006 |

OTHER PUBLICATIONS

PCT/ISA/237 Written Opinion issued on PCT/KR2012/005699 (pp. 4).
PCT/ISA/210 Search Report issued on PCT/KR2012/005699 (pp. 3).

* cited by examiner

*Primary Examiner* — M. R. Sedighian
(74) *Attorney, Agent, or Firm* — The Farrell Law Firm, P.C.

(57) ABSTRACT

Proposed is a method for providing additional information to a mobile communication terminal by means of visible light communication in an information display device having an LED backlight unit. For this purpose, the method of the present invention comprises the steps of: receiving, from a mobile communication terminal, a request for additional information on an object in a content image when a content image is being displayed on a screen of an information display device; determining whether or not there exists additional information corresponding to the request; and controlling, if said additional information does exist, the light emission of the LED backlight unit so as to transmit said additional information in the form of visible light to the mobile communication terminal. Further, according to the present invention, it is possible to provide various additional information corresponding to the request from the mobile communication terminal.

14 Claims, 11 Drawing Sheets

VISIBLE LIGHT COMMUNICATION METHOD IN AN INFORMATION DISPLAY DEVICE HAVING AN LED BACKLIGHT UNIT, AND INFORMATION DISPLAY DEVICE FOR THE METHOD

PRIORITY

This application is a National Phase entry of PCT/KR2012/005699, which was filed on Jul. 17, 2012, and claims priority under 35 U.S.C. §119(a) to Korean Patent Application No. 10-2011-0075486, which was filed in the Korean Intellectual Property Office on Jul. 28, 2011, the contents of each of which is incorporated herein by reference.

TECHNICAL FIELD

The present invention relates to a visible light communication terminal and a method of controlling the same, and more particularly, to an apparatus and a method for providing information to a visible light communication terminal through an information display device using an LED backlight.

BACKGROUND ART

General visible light communication is performed through a process in which a transmitter outputs a visible light by using a light source such as a Light Emitting Diode (LED) or a Laser Diode (LD) and a receiver processes the visible light by using a Photo Detector (PD). As a light emission efficiency of the LED has been improved and a cost of the LED has been reduced, the LED has been generalized in a typical lighting market including a fluorescent light and an incandescent light as well as a special lighting market including a portable device, a display, a vehicle, a traffic light, and a billboard.

Particularly, a market including a large size billboard also has been continuously grown. A market of a billboard using a large size LCD screen has been continuously grown in the market of the large size billboard. The billboard is called various names such as a Digital Information Display (DID), a Digital Signage (DS), and a Large Format Display (LFD). For example, a DID device uses a technology of innovating a paradigm of information transmission through bidirectional communication between a user and a supplier by combining a function executed by a notice using a conventional paper medium and a unidirectional advertisement through broadcasting and a function executed by a display and an Information Technology (IT), which is spotlighted as a technology of having a cost reduction effect in a long-term point of view in comparison with a conventional transmission medium. A recent DID technology extends its business area to outdoor advertisement and 3 Dimensional (3D) fields, and accordingly, general people easily encounter advertisement media to which a DID solution is applied.

Various information display devices having a display unit in addition to the DID device adopt the LED for a BackLight Unit (BLU) for lighting. Since the LED may be used as a light source for visible light communication, research on information display devices having more convenient and various functions using the backlight unit adopting the LED is required.

DETAILED DESCRIPTION OF THE INVENTION

Technical Problem

As described above, as the information display devices having the backlight unit adopting the LED increase, research on visible light communication using the LED is actively progressed.

However, even though the information display device such as the DID device can operate as a visible light transmitter since the LED serves to transmit a visible light, a service using a visible light communication scheme has not been yet proposed.

In addition, since it is expected that a future system for short distance communication mainly utilizes a method using a visible light, various terminals as well as the information display device are required to support such a visible light communication scheme. Accordingly, a relationship between an information display device and a mobile communication terminal carried by most users and a method of allowing various services to be used between them are currently required.

Technical Solution

Accordingly, the present invention provides an apparatus and a method in which an information display device provides various pieces of additional information to a mobile communication terminal through visible light communication.

Further, the present invention provides an apparatus and a method for allowing an information display device to operate as a visible light communication device by using an LED backlight unit within the information display device.

In addition, the present invention provides an apparatus and a method for providing a service model which can be differently applied according to a condition of an information display device.

In accordance with an aspect of the present invention, a method of visible light communication by an information display device including an LED backlight unit is provided. The method includes: displaying an image including one or more objects; receiving a request for additional information on the one or more objects; determining an object corresponding to an area where the request for the additional information is received among the one or more objects; searching for additional information on the determined object; transmitting, when there is no found additional information, a request for additional information including information on the information display device to a server; and transmitting, when the additional information corresponding to the information on the information display device is received from the server, the received additional information through an LED of an area where the determined object is located among a plurality of LEDs within the LED backlight unit.

In accordance with another aspect of the present invention, an information display device for visible light communication is provided. The information display device includes: a memory that stores a content image and additional information on one or more objects within the content image; a controller that, when receiving a request for additional information on a particular object, searches for additional information corresponding to the request for the additional information in the memory; a display unit that outputs the content image; an LED backlight unit including a plurality of LEDs located at a rear surface of the display unit; and a backlight driver that transmits the additional information by controlling a light emission of an LED block in a position of the particular object under a control of the controller.

Effects of the Invention

According to the present invention, as the information display device operates as the visible light communication device by using the LED backlight unit, additional information can be provided to the mobile communication terminal. Further, according to the present invention, as a relationship between the information display device and the mobile communication terminal is defined, additional information can be provided to the mobile communication terminal in various ways.

BEST MODE FOR CARRYING OUT THE INVENTION

Figure 1:
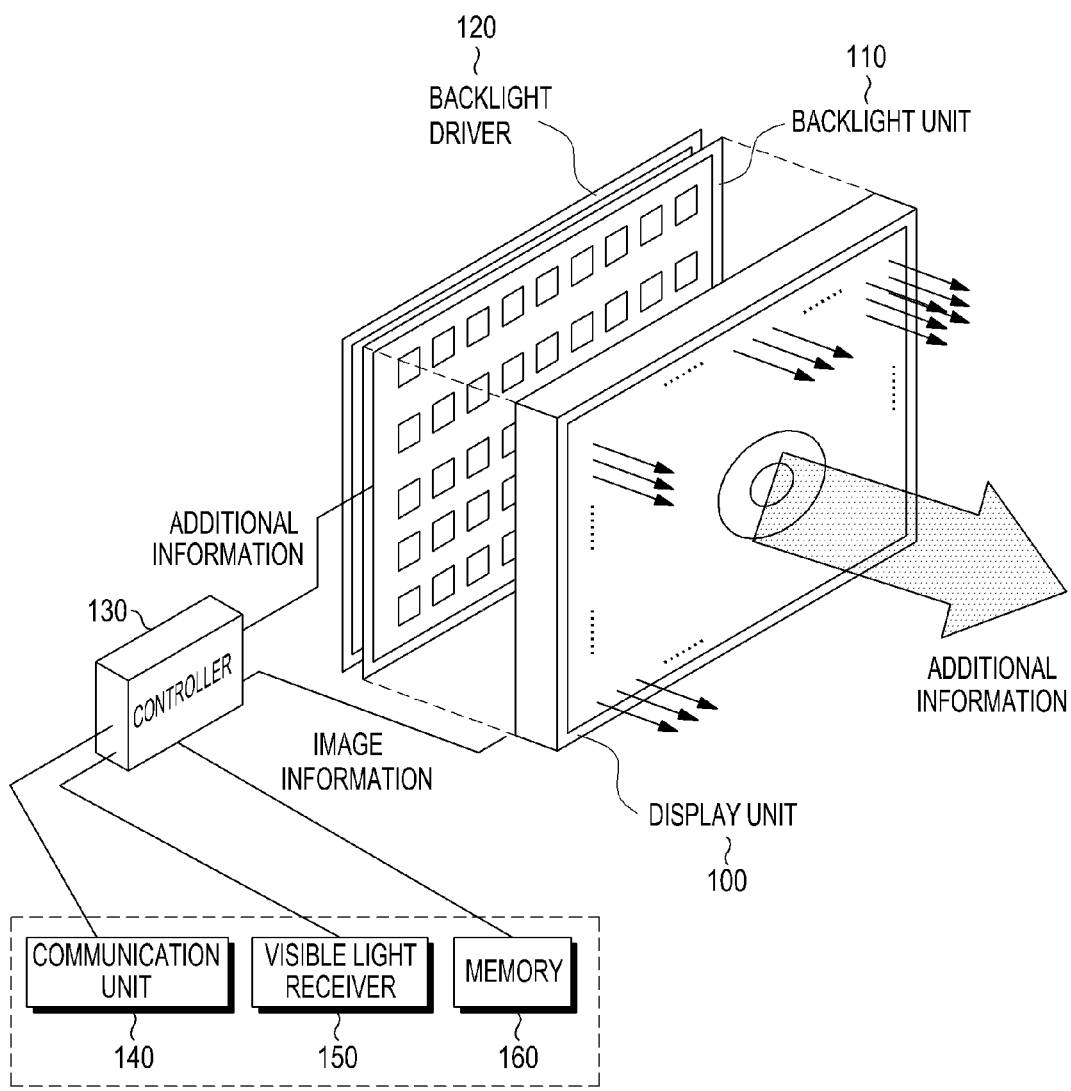
FIG. 1 is a perspective view of an internal configuration of an information display device according to an embodiment of the present invention.

Hereinafter, exemplary embodiments of the present invention will be described with reference to the accompanying drawings. The same elements will be designated by the same reference numerals although they are shown in different drawings. Further, in the following description of the present invention, a detailed description of known functions and configurations incorporated herein will be omitted when it may make the subject matter of the present invention rather unclear.

In a detailed description below, a representative embodiment of the present invention to solve the technical problem will be suggested. In addition, although terms defined in visible light communication will be used for the convenience of description of the present invention, the standard and names do not limit the scope of the present invention.

The present invention provides a method of providing additional information from an information display device having an LED backlight unit to a mobile communication terminal through visible light communication. For the method, the present invention includes a step of, in a state where an information display device displays a content image on a screen, receiving a request for additional information on an object of the image from a mobile communication terminal, a step of determining whether there is the additional information corresponding to the request, and a step of, when there is the additional information, transmitting the additional information to the mobile communication terminal in a form of the visible light by controlling a light emission of the LED backlight unit. According to the present invention, it is possible to provide various pieces of additional information corresponding to a request of the mobile communication terminal.

Components and operations of the information display device realizing the above functions will be described with reference to FIG. 1.

A Liquid Crystal Display (LCD) is used as a display unit 100 of the information display device. A BackLight Unit (BLU) 110 refers to a complex including a light source for radiating a light from a rear side of the LCD panel, a power circuit for driving the light source, and components for forming a planar light. The BLU is configured to include a plurality of LEDs.

Since the visible light communication uses an LED, when the LED of the backlight unit of the information display device is used as the light source, the information display device can operate as a transmission side of the visible light communication without the LED.

A configuration of FIG. 1 is a basic structure for the visible light communication, and a visible light transmission function of the information display device will be described below. In the present invention, all devices having a display unit using the LED such as a Digital Information Display (DID), a Digital Signage (DS), or a Large Format Display (LFD) as the backlight unit are defined as the information display device.

A controller 130 performs a function of controlling a general operation of the information display device and may determine transmission, modulation, and encoding schemes of additional information to be transmitted through the visible light communication. The additional information may be received together with content data provided from the server.

Here, the additional information refers to information on an object of an image output through a screen of the information display device. Further, the object may have various forms such as a person, an item, an icon, a mark, and a symbol displayed in the image. In addition, the additional information includes an identifier of the object, control information such as an object position within an image to which the additional information is output, and detailed information on the object. The additional information may include a version of the additional information as the detailed information on the object such that the information display device or the visible light communication terminal does not receive duplicated additional information.

Further, there are one or more objects in the image. When there are a plurality of objects, the number of additional information may be plural. Accordingly, in this case, the additional information includes information indicating whether the number of additional information is plural, and content data may include a plurality of additional information in a list form. Further, the additional information may be information such as a Uniform Resource Locator (URL) indicating a position where the information on the object is stored.

When content data from the server is input to the information display device, the controller 130 determines whether the additional information is included in the input content data and separates image information and the additional information for controlling the display unit 100 from the content data. Subsequently, the image information is transmitted to the display unit 100, and the additional information is transmitted to the backlight unit 110. The screen is configured based on such image information and then a content image is output. A backlight driver 120 controls flickering of LEDs according to control information within the additional information.

When the image information and the additional information are separated from each other, the controller 130 transmits the additional information to the backlight driver 120 and directly outputs the additional information according to the control information within the additional information. Alternatively, the controller 130 first stores the additional information in a memory 160 and then transmits the additional information to the backlight driver 120 when there is a request for the additional information by the mobile communication terminal, so as to control the additional information to be output.

The backlight driver 120 transmits the additional information in a form of the visible light by driving an LED corresponding to a position of the object within the image based on the control information within the additional information. Here, the control of the LED within the backlight unit 110 may be performed for each individual LED or in the unit of a predetermined number of blocks by the controller 130.

Figure 2A:
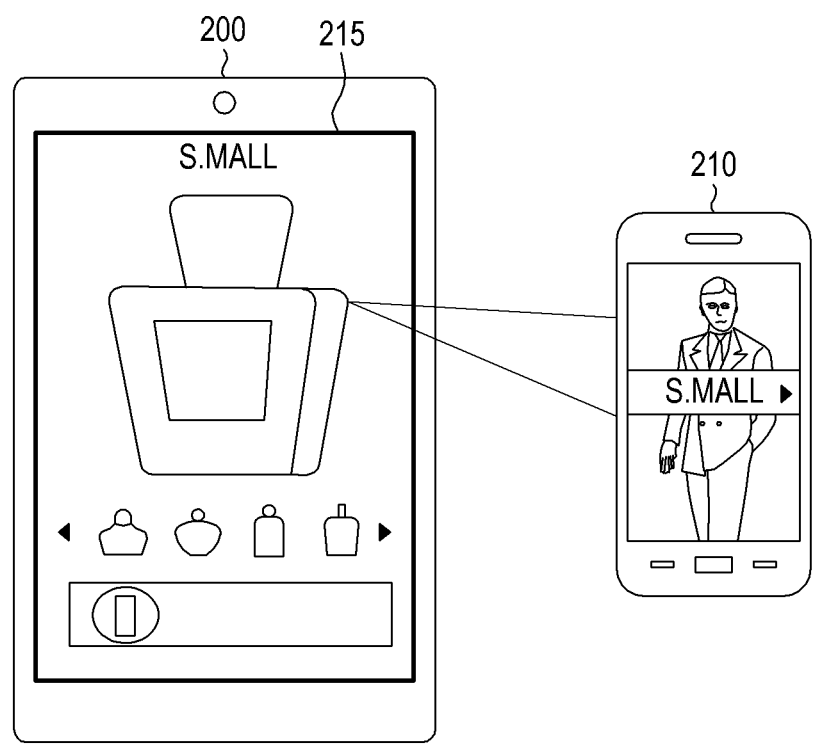
FIGS. 2A to 2D illustrates examples of a service model based on an LED driving method according to an embodiment of the present invention.
Figure 2B:
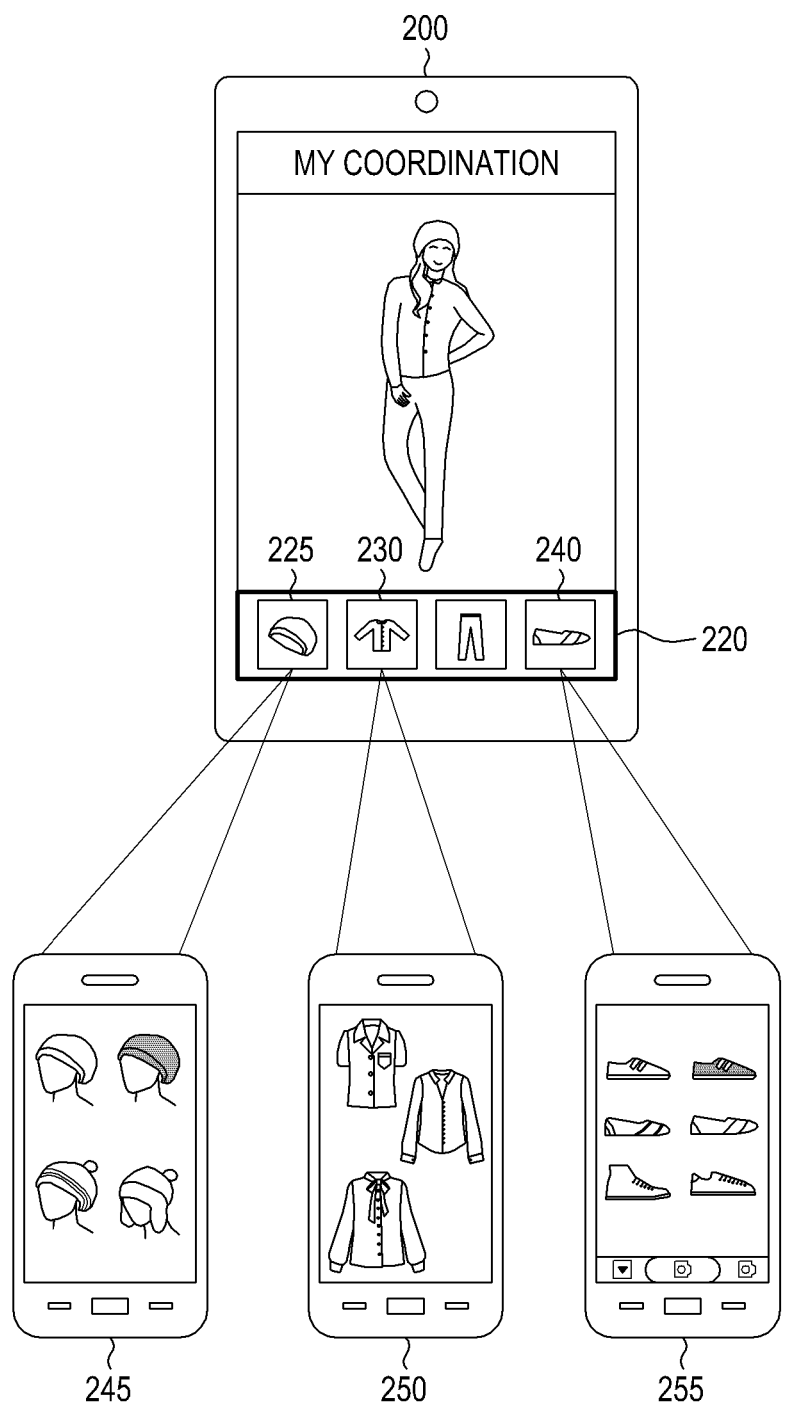
Figure 2C:
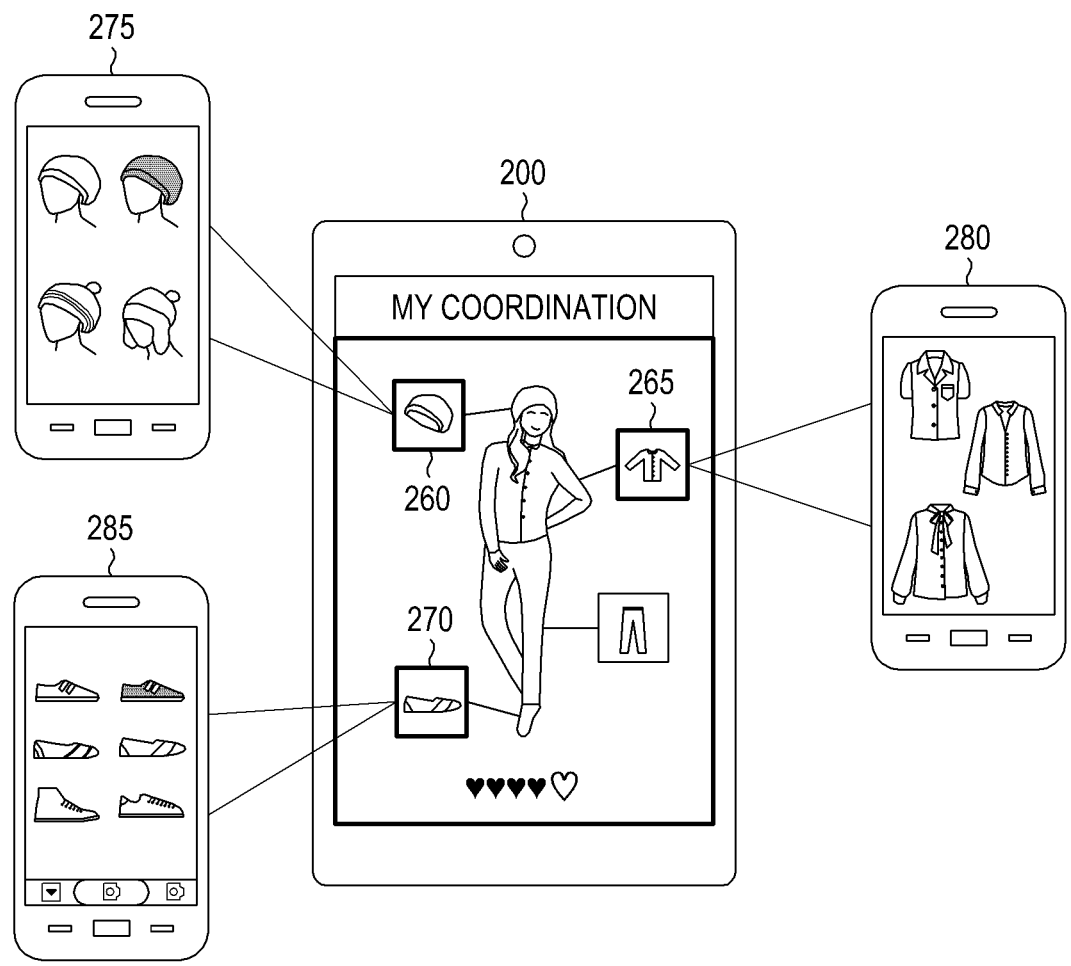

A method of driving the LED will be described in detail with reference to FIGS. 2A to 2C. FIGS. 2A to 2C illustrate service models changed according to an LED driving method. According to whether the number of additional information is singular or plural, it may be determined whether to drive the entire LEDs, individually drive each LED, or drive grouped LEDs in the unit of blocks.

FIG. 2A illustrates a case where only one additional information can be provided. In this case, the information display device 200 may output additional information in a form of the visible light through the entire LEDs within the backlight unit, that is, a whole screen 215. When the mobile communication terminal 210 becomes close to the information display device 200, a screen according to the provision of the additional information is output.

Accordingly, the additional information is transmitted at a designated time and a designated position within the screen. The additional information may correspond to an image displayed on the screen or a voice output through a speaker, or may be output separately from the image or the voice.

FIG. 2B illustrates a case where a plurality of additional information can be provided but a provision position of the additional information is fixed. In this case, by individually driving LED blocks in a predetermined position 220 within the backlight unit 110, different pieces of additional information can be output. As described above, in FIG. 2B, there are a plurality of activation areas 225, 230, and 240 in the particular position 220 of the screen by driving the LEDs individually or in the unit of blocks. Accordingly, the mobile communication terminals 245, 250, and 255 receive different additional information based on positions within the visible light activation areas.

For example, when the mobile communication terminal 245 is located at the visible light activation area 225 of the predetermined area 220 of the information display device 200 where hat information is displayed, the mobile communication terminal 245 may receive additional information on the hat information and display the additional information on the screen.

FIG. 2C illustrates a case where a plurality of additional information can be provided but a provision position of the additional information is variable. In this case, when LED blocks to be individually driven within the backlight unit are determined, different pieces of additional information can be output for each of the LED blocks. The positions of visible light activation areas 260, 265, and 270 where the additional information is output are changed according to an image output through the screen as illustrated in FIG. 2C. Further, the information display device may be implemented to display a notice function so that a user of the mobile communication terminal can recognize the existence or nonexistence of the additional information. Accordingly, mobile communication terminals 275, 280, and 285 display different pieces of additional information as they are located at the visible light activation areas 260, 265, and 270, respectively. Positions and forms of the visible light activation areas 260, 265, and 270 may be adaptively changed according to a position and a form of the object within the image as illustrated in FIG. 2D.

Figure 2D:
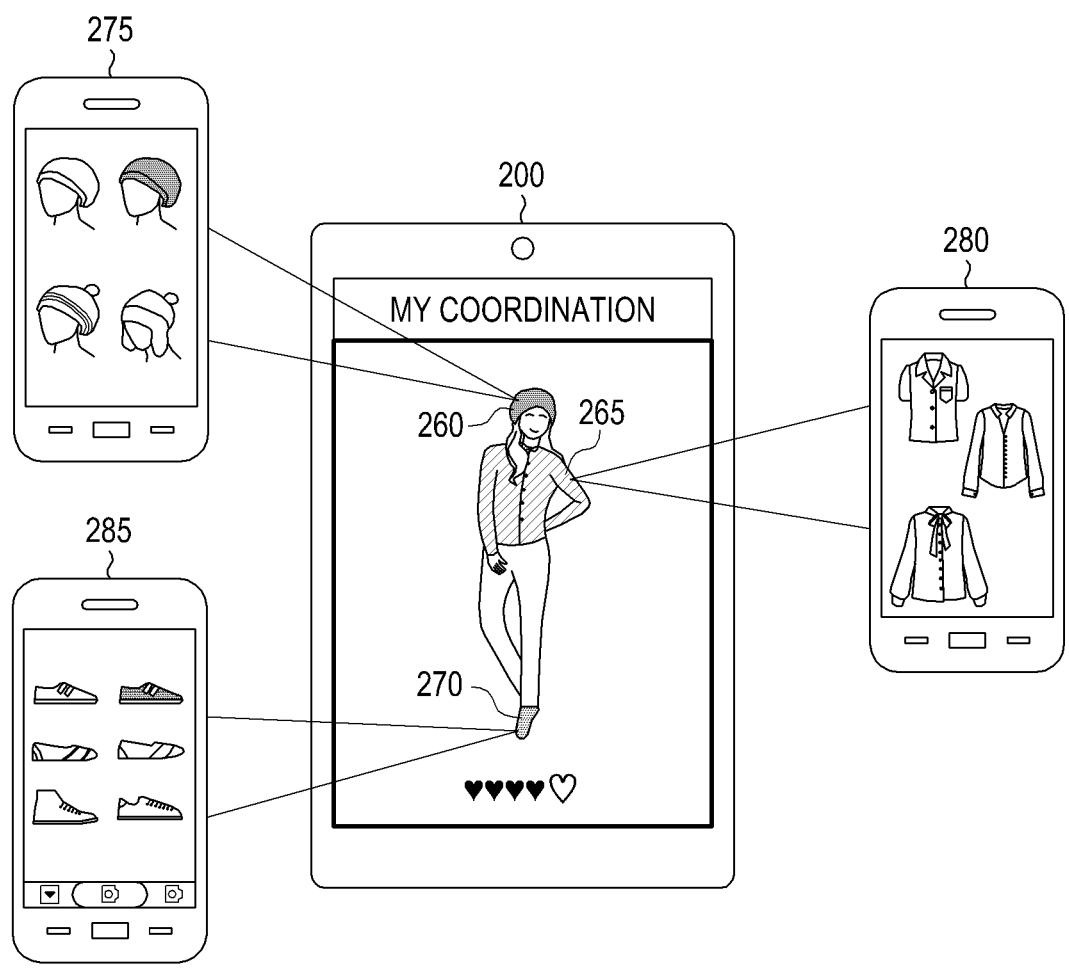

As illustrated in FIGS. 2B to 2D, a hat, a piece of clothing, or a shoe may be designated as the object in the image displayed by the information display device, and the information display device transmits additional information through the separate visible light activation areas as illustrated in FIG. 2B or 2C or through the LEDs of the area where the hat, clothing, or shoe is located as illustrated in FIG. 2D. Although FIGS. 2A to 2D illustrate the visible light activation areas according to an embodiment of the present invention, they are only an example and the present invention is not limited thereto. That is, the visible light activation area can be provided in various ways according to a selection by a service provider or a company manufacturing the information display device.

As described above, since the LED can be used as the light source for the visible light communication, the information display device can perform the visible light communication. The information display device may further include a communication unit 140 for a connection with the server. For example, the communication unit 140 includes a mobile communication module, a wireless Internet module, or a short distance communication module which transmits/receives a wireless signal to/from the server over a mobile communication network. The information display device including the communication unit 140 can make a request for information to the server.

The information display device may further include a visible light receiver 150 for receiving a request for information from the mobile communication terminal. The visible light receiver 150 corresponds to a light receiving element and may convert a visible light signal from the mobile communication terminal to an electrical signal. An image sensor or a photodiode may be used as the light receiving element. As described above, the information display device may operate as a transmission side of the visible light communication without a separate device. When the information display device includes the light receiving element, the information display device may perform all transmission/reception functions of the visible light communication.

Although a method of transmitting additional information may be changed according to a function or a condition of the information display device, the backlight driver 120 identifies a position of the additional information to be output through the screen and transmits the additional information by driving the LED located at the position.

The memory 160 stores information provided from the server. When there is additional information to be provided to the mobile communication terminal in the provided information, the memory 160 stores the additional information and control information related to the additional information. The control information related to the additional information corresponds to a version of the additional information, a position of the screen where the additional information is output, a start time of the additional information, a reproduction time of the additional information, or an end time of the additional information. The additional information and the control information related to the additional information may be stored in a separate database.

Hereinafter, components and operations of an additional information providing system using the visible light communication which realizing the above described functions will be described with reference to FIG. 3.

Figure 3:
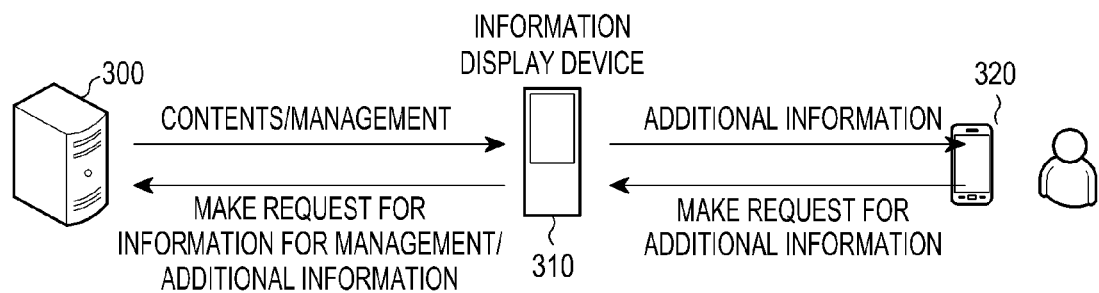
FIG. 3 illustrates a configuration of a system for providing additional information by using visible light communication according to an embodiment of the present invention.

Referring to FIG. 3, the additional information providing system includes a server 300 for managing an information display device 310 and providing information according to a request signal or as necessary, the information display device 310 for showing an image to a user through the screen and providing additional information through visible light communication, and a mobile communication terminal 320 for receiving the additional information from the information display device 310 through the visible light communication. The management of the information display device 310 and an update to new data may be performed by the server 300.

Specifically, the server 300 corresponds to a service provider which provides content data to the information display device 310 and manages additional information to be provided to the user at the same time, and manages one or more information display devices 310. Here, the additional information refers to detailed information on image information output through the screen of the information display device. For example, when a product advertisement image is displayed on the screen of the information display device, the additional information includes detailed information on the product. The additional information may be in a content form such as an image or audio data and may include an address from which information can be directly provided.

The user of the mobile communication terminal 320 may receive visible additional information from the information display device 310 or receive additional information by making a request for the additional information. At this time, the request for the additional information may be transmitted to the information display device 310 in a form of the visible light by the user using the mobile communication terminal 320 or directly transmitted through an input device of the information display device 310. For example, a touch screen of the information display device 310 may be used as the input device.

Meanwhile, in response to the request by the user, the information display device 310 may directly provide the additional information stored in the memory or database DB or make a request for the additional information to the server 300 and then receive the additional information. The information display device 310 may be implemented to provide the additional information when there is the request by the user. In this case, the screen of the information display device 310 may be configured such that only the existence or nonexistence of the additional information is simply informed to the user without assigning many areas of the screen to transmit the additional information and the additional information is downloaded by only the user who desires the additional information.

Meanwhile, contents to be exchanged to provide the additional information may be changed according to a relationship among the server, the information display device, and the mobile communication terminal.

Figure 4A:
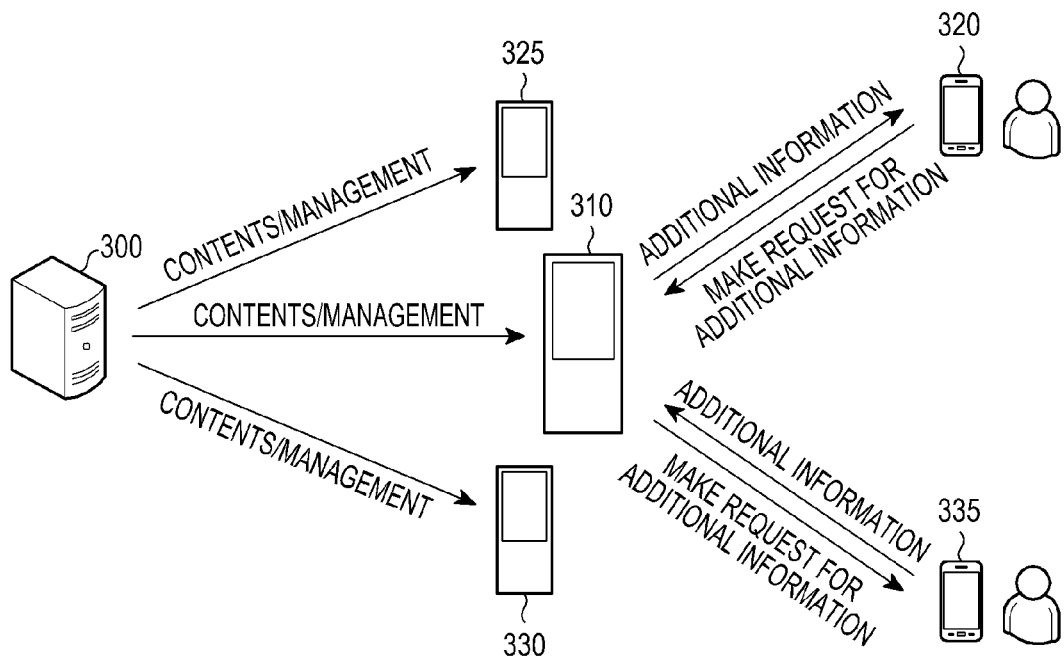
FIG. 4A illustrates an example of a relation for providing additional information among a server, an information display device, and a visible light communication terminal according to an embodiment of the present invention.

FIG. 4A illustrates an example of a relationship of a service model in which the server 300 manages a plurality of information display devices 310, 325, and 330. Communication between the server 300 and the information display devices 310, 325, and 330 may be unidirectional, and the server 300 cannot continuously update information which each of the information display devices 310, 325, and 330 requires. Further, communication between the information display devices 310, 325, and 330 and mobile communication terminals 320 and 335 may be bidirectional, and the information display devices 310, 325, and 330 may provide additional information in response to a request for the additional information by the mobile communication terminals 320 and 335.

Figure 4B:
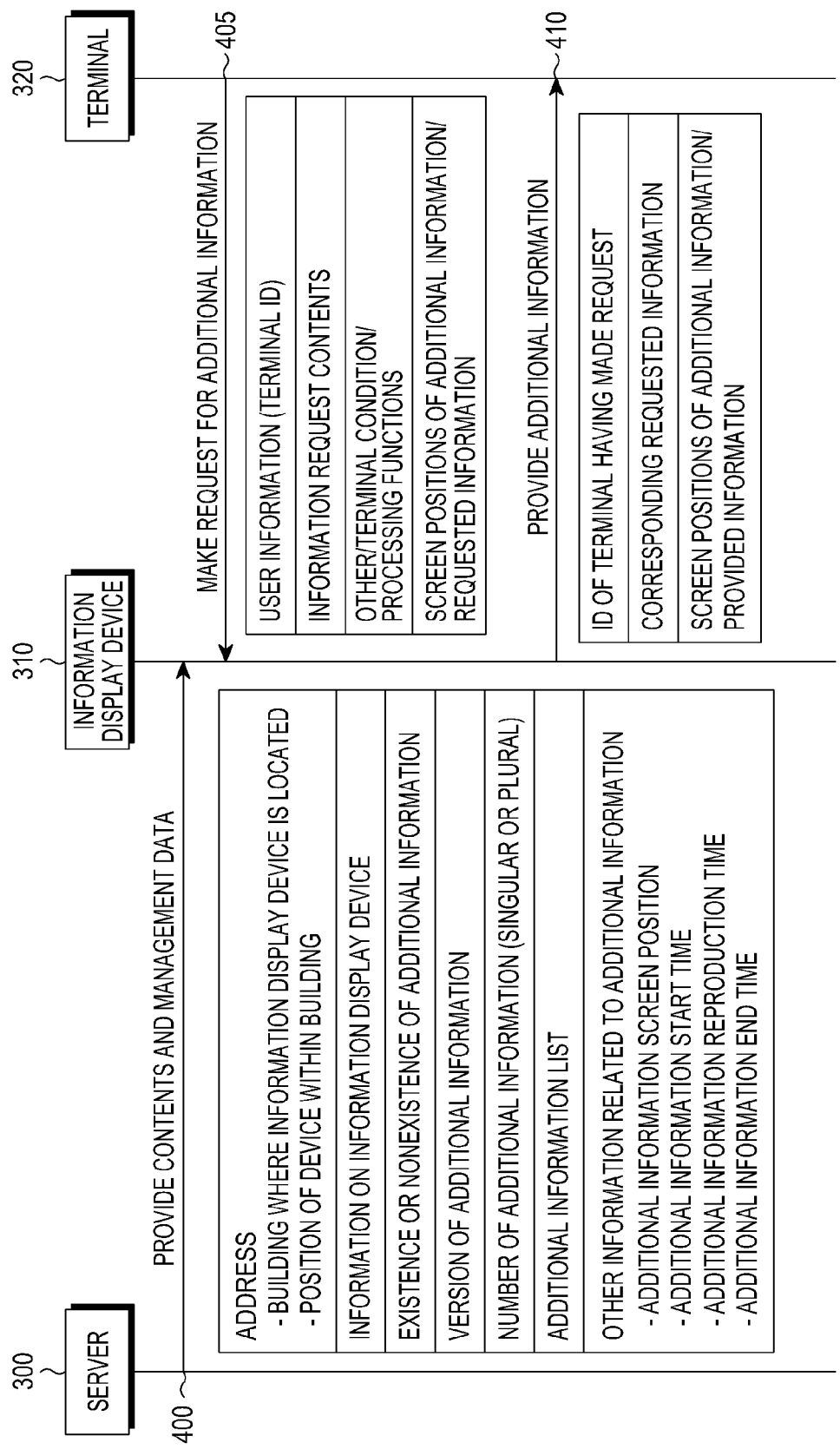
FIG. 4B illustrates an example showing a text of a message exchanged in FIG. 4A.

Texts of the messages exchanged among the server 300, the information display devices 310, 325, and 330, and the mobile communication terminals 320 and 335 are illustrated in FIG. 4B.

First, in order to manage the information display devices 310, 325, and 330, the server 300 provides a message including information and management data for managing the information display device 310 in step 400. The message transmitted to the information display devices 310, 325, and 330 includes the following items.

The message transmitted to the information display devices 310, 325, and 330 includes an address of the information display device, an ID of the information display device, the existence or nonexistence of the additional information, the number of pieces of additional information, an additional information list when the number of pieces of additional information is plural, and other information related to the additional information.

When there are a plurality of information display devices as illustrated in FIG. 4A, the address of the information display device refers to an address of a building in which the device is installed and a position of the information display device within the building. An address system or an address format is irrelevant to the present invention and thus is not considered in this specification.

Information on the information display device refers to information for identifying a plurality of information display devices and may use an ID of the information display device.

The version of the additional information refers to a version number used when the additional information is updated and is used for distinguishing pieces of additional information.

The existence or nonexistence of the additional information serves to inform whether the additional information is included in content data.

The number of pieces of additional information is for identifying whether one or more pieces of additional information are included. When the number of pieces of additional information is plural, the additional information list is also included.

Other related information includes a position of the screen to which the additional information is transmitted, a start time, an end time, and a reproduction time.

In step 400, when contents and management data including the additional information and control information related to the additional information are provided, they are stored to be a database.

Thereafter, when there is a request for the additional information by the terminal 320 in step 405, the information display device 310 provides the additional information by controlling a light emission of the LED in step 410. The message for the request for the additional information includes user information, for example, a terminal ID, information request contents, a terminal condition, a processing function, and information such as screen positions of the additional information and the requested information. When the request for the additional information is made by a plurality of terminals, the terminal ID is used to distinguish the terminals having made the request for the additional information by the information display device.

The information request contents include information requested by the user and the number of pieces of requested information since the number of pieces of information requested by the user may be plural. The terminal condition refers to a capability or a processing function of the terminal, for example, a format of the information which can be processed by the terminal. The terminal condition may be used as a parameter which desires to receive customized additional information which can be processed by the terminal. Further, information designating a screen position is provided such that the additional information that fits the screen of the terminal 320 can be provided.

Meanwhile, when receiving a plurality of requests for the additional information, the information display device 310 distinguishes between the additional information by using the user information to distinguish users. Subsequently, the information display device 310 searches for the additional information corresponding to the requests in its own database. When there is the additional information, the information display device 310 provides an ID of the terminal having made the request, the requested information, and screen positions of the additional information and the provided information. The requested information refers to a content of the information provided by the information display device in accordance with the information request content.

Figure 5A:
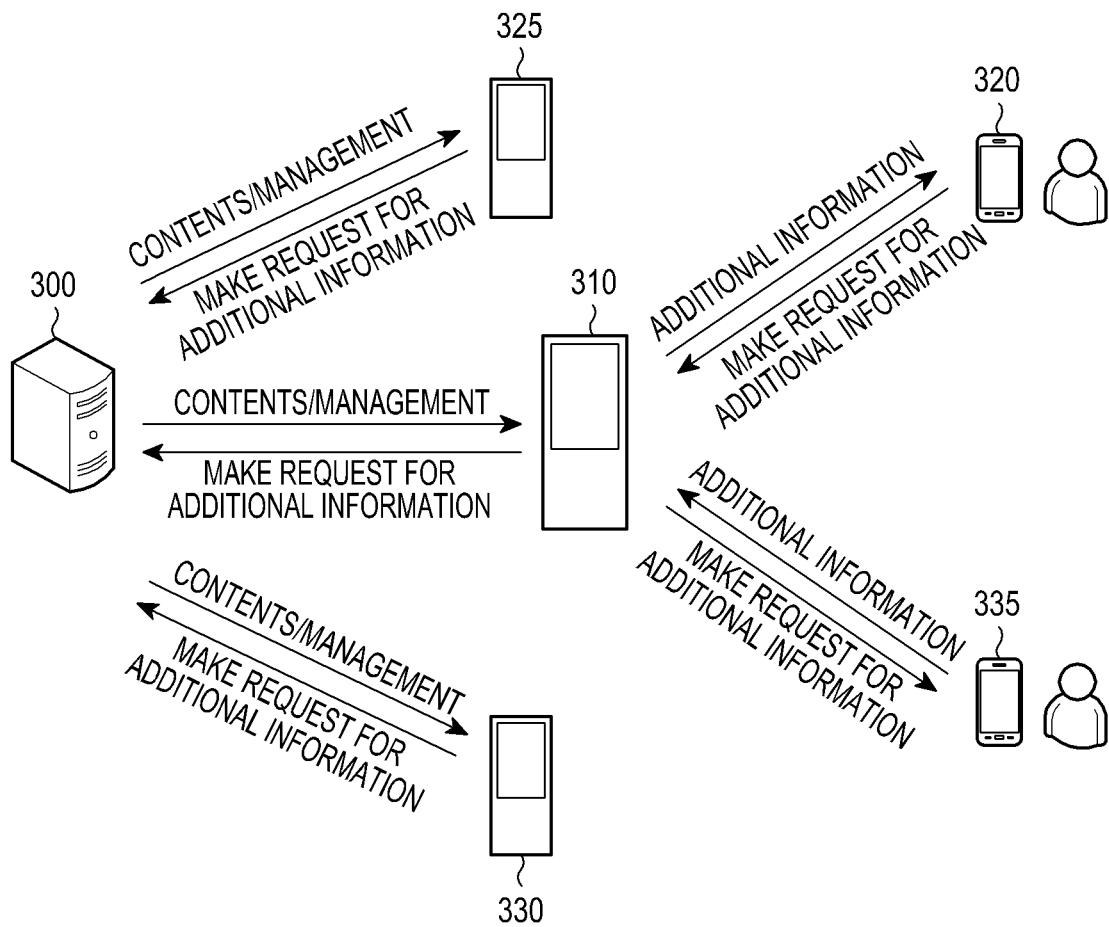
FIG. 5A illustrates another example of a relation for providing additional information among a server, an information display device, and a visible light communication terminal according to an embodiment of the present invention.

FIG. 5A illustrates another example of a relationship of a service model in which the server 300 manages a plurality of information display devices 310, 325, and 330. Communication between the server and the information display devices 310, 325, and 330 and communication between the information display devices 310, 325, and 330 and the mobile communication terminals 320 and 335 are all bidirectional. In the bidirectional communication, customized additional information corresponding to the requests for the additional information by the mobile communication terminals 320 and 335 may be provided. In such a service model, since the communication between the server 300 and the information display devices 310, 325, and 330 is bidirectional, services under various conditions are possible.

In response to the requests by the information display devices 310, 325, and 330, the server 300 can provide customized data satisfying conditions of the information display devices 310, 325, and 330 and also provide customized data satisfying conditions of the mobile communication terminals 320 and 335. Similarly, in response to the requests for the additional information by the terminals 320 and 335, the information display devices 310, 325, and 330 can process only required parts and make a request for the processed parts to the server 300, or transmit a request including information on the terminal to the server 300 and make the server 300 perform all processing operations.

Figure 5B:
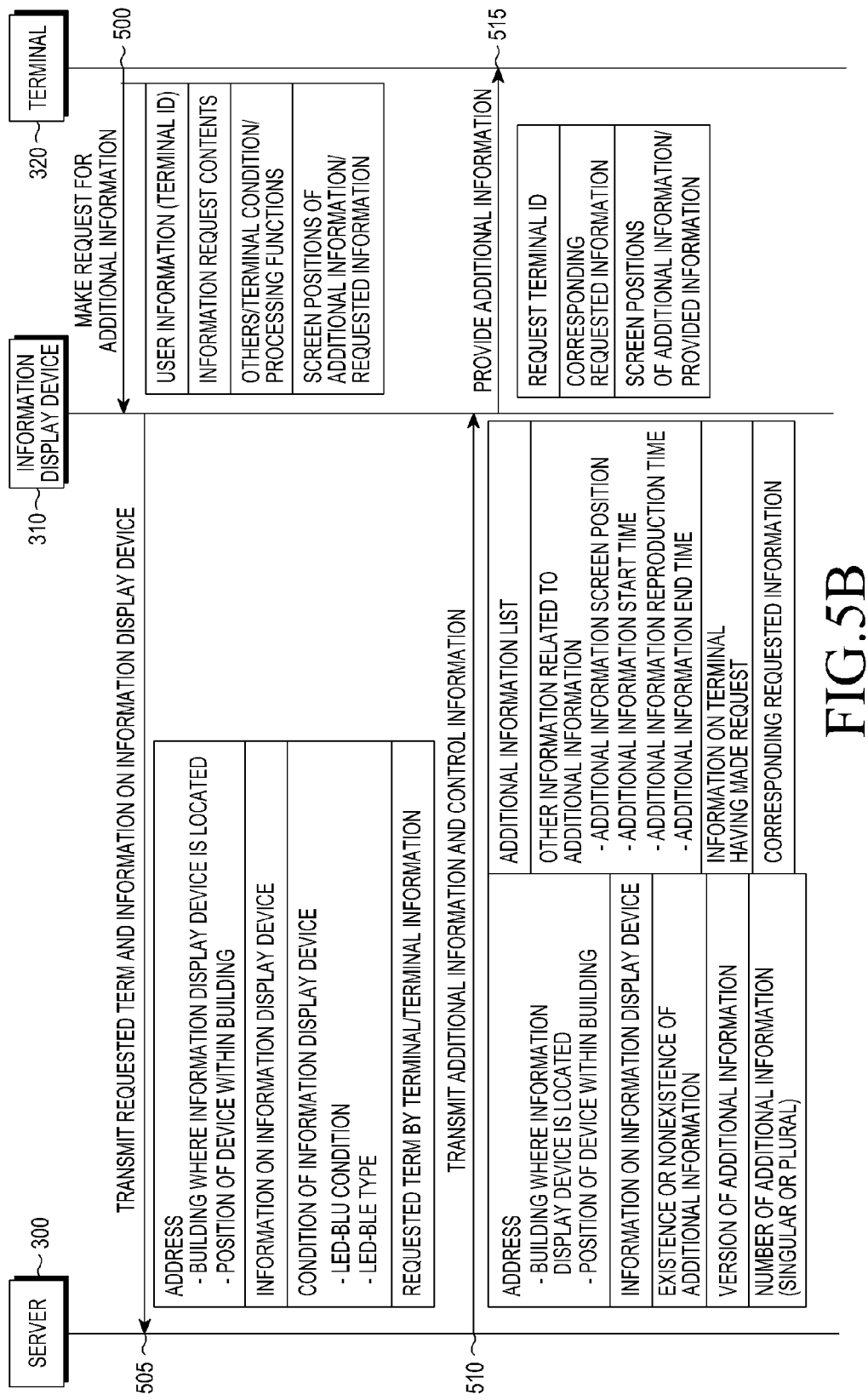
FIG. 5B illustrates an example showing a text of a message exchanged in FIG. 5A.

Texts of the messages exchanged among the server 300, the information display devices 310, 325, and 330, and the mobile communication terminals 320 and 335 are illustrated in FIG. 5B. Since descriptions of the texts included in the messages exchanged in FIG. 5B are similar to those of FIG. 4B, detailed descriptions thereof will be omitted.

However, in FIG. 5B, when a request for additional information is received in step 500, the information display device 310 may provide a condition of the information display device to the server 300 in step 505. The condition of the information display device includes all of a hardware condition and a software condition. The hardware condition of the information display device refers to a condition such as a capability, a position, and an arrangement of the LEDs pre-installed in hardware under a condition according to the use of the LEDs of the backlight unit of the information display device through visible light communication. The software condition refers to a capability of software installed to provide a service. As described above, the server 300 may accurately provide contents and additional information which can be processed by the information display device 310 in step 510 by receiving the condition of the information display device 310 from the information display device 310. Further, detailed screen information executed in the information display device 310 may be also provided through the message by the server 300. Accordingly, the information display device 310 may provide the additional information corresponding to the request for the additional information in step 515.

Hereinafter, operations in the information display device will be described with reference to FIG. 6. Although the following description is made with reference to FIGS. 2A to 2D as an example, the screen providing the additional information according to the present invention is not limited thereto.

Figure 6:
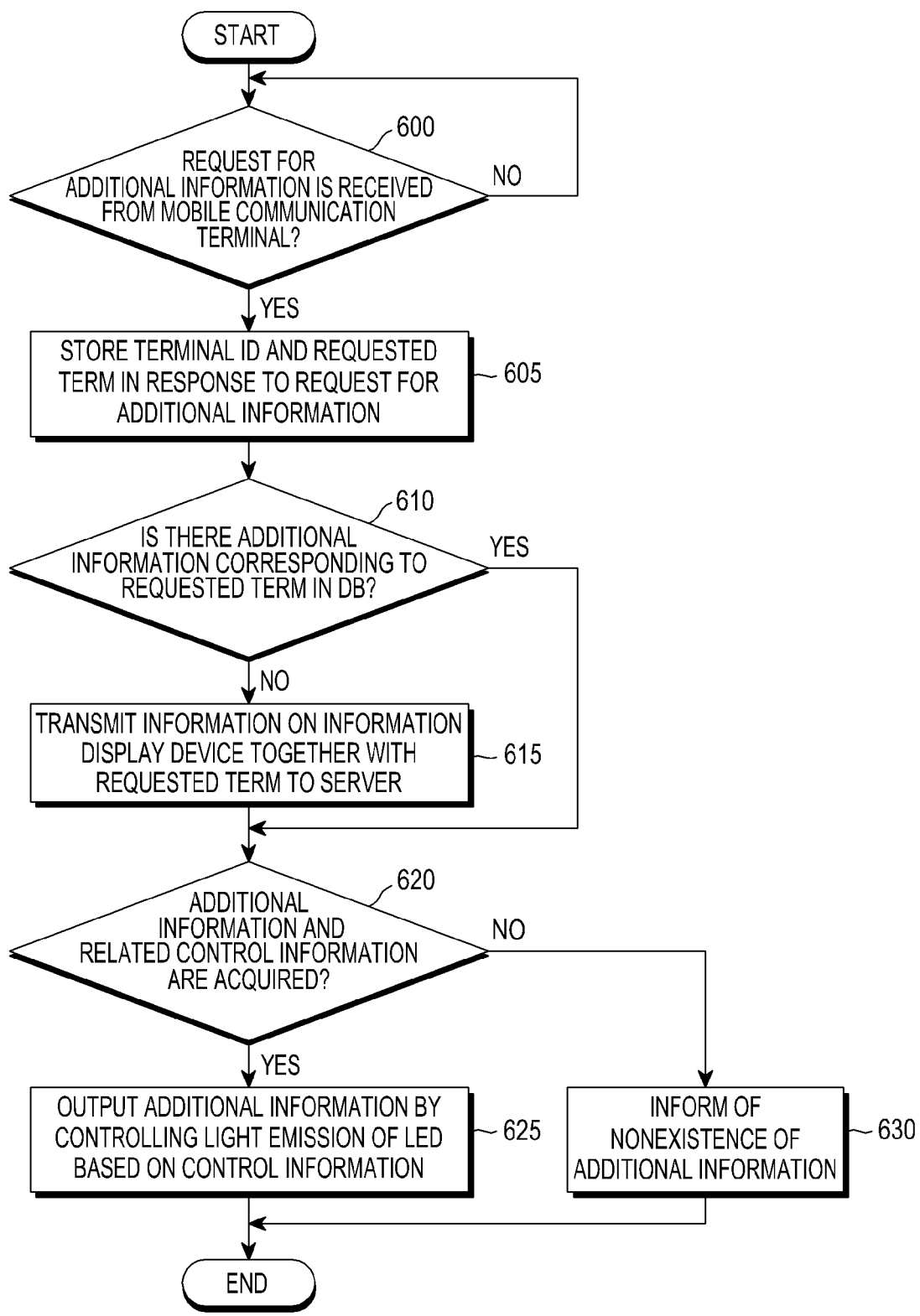
FIG. 6 is a flowchart illustrating an operation for providing additional information by an information display device according to an embodiment of the present invention.

Referring to FIG. 6, the information display device first displays an image including one or more objects as illustrated in FIGS. 2A to 2D. Subsequently, when the information display device 310 receives a request for the additional information from the mobile communication terminal in step 600, the information display device 310 stores a terminal ID and a requested term in response to the request for the additional information in step 605. The request for the additional information may be received in a form of the visible light from the mobile communication terminal, or may be made directly by the user through an input means of the information display device. For example, a screen position of the requested additional information and information on a selected object may be received through the input means.

When a request for additional information on a particular object within the image is received from the mobile communication terminal in a form of the visible light, the information display device determines the object corresponding to an area where the request for the additional information is received and then determines whether there is the additional information on the object.

Accordingly, the information display device determines whether there is the additional information corresponding to the requested term in its own database in step 610. When there is no corresponding additional information, information on the information display device is transmitted to the server together with the requested term in step 615. When there is the additional information, step 620 is performed. When the additional information and control information related to the additional information are acquired in step 620, the additional information is output by controlling a light emission of the LED based on the control information in step 625. When the corresponding additional information is not acquired, nonexistence of the additional information is informed to the user in step 630.

Figure 7:
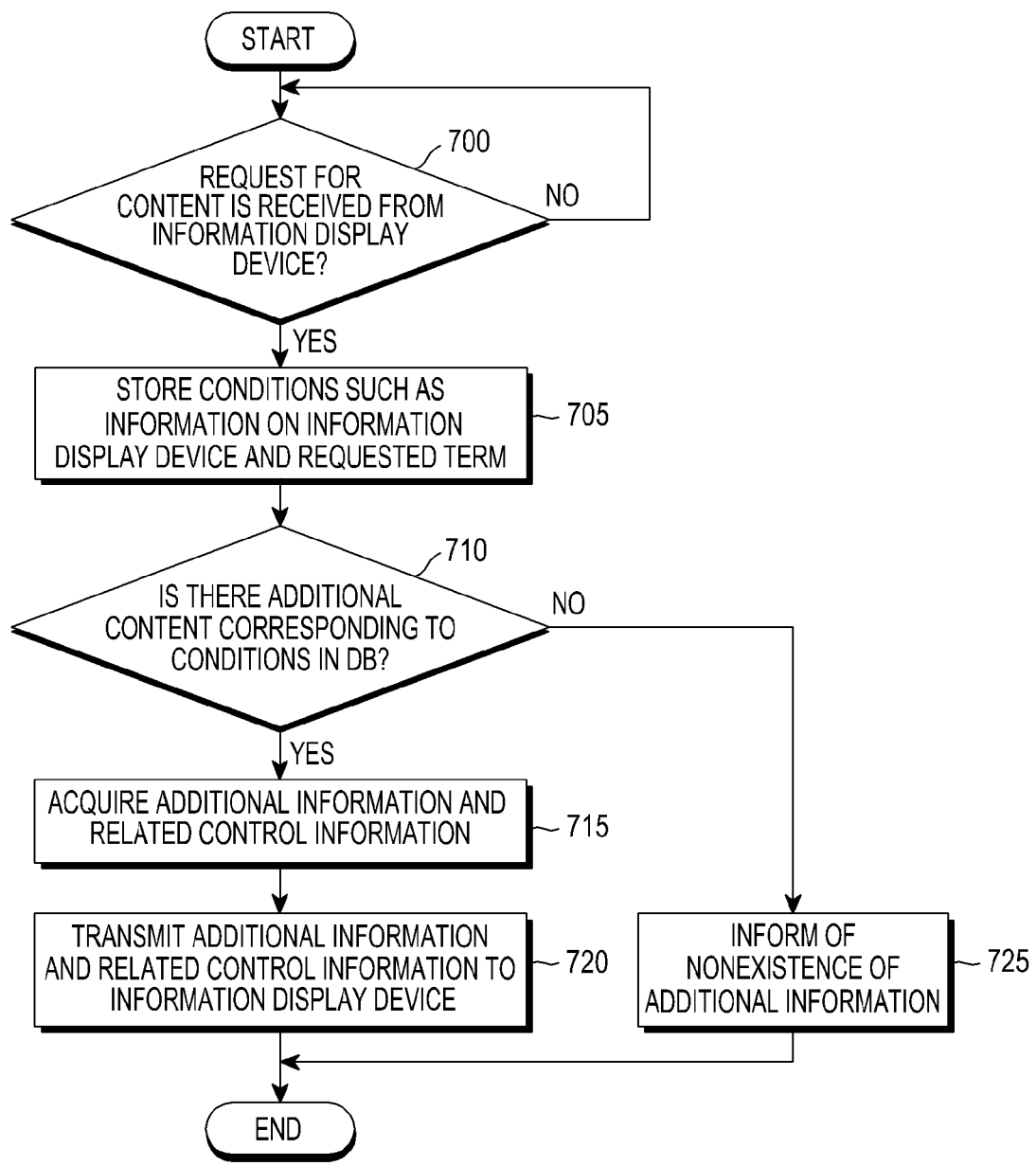
FIG. 7 is a flowchart illustrating an operation for providing additional information by a server according to an embodiment of the present invention.

Meanwhile, operations in the server will be described with reference to FIG. 7. Referring to FIG. 7, when the server receives a request for information from the information display device in step 700, the server stores conditions such as information on the information display device and a requested term in step 705. Subsequently, it is determined whether there is additional information corresponding to the conditions in a server database in step 710. When there is the additional information, the additional information and control information related to the additional information are acquired in step 715 and then the acquired additional information and control information are transmitted to the information display device in step 720. When the corresponding additional information is not acquired, nonexistence of the additional information is informed to the information display device in step 725.

The invention claimed is:

1. A method of visible light communication by an information display device comprising an LED backlight unit, the method comprising:
   displaying an image including at least one object on a display unit;
   receiving a request of a user for additional information input on the at least one object, wherein the LED backlight unit receives the input from an electronic device of the user;
   determining an object corresponding to an area on the display unit where the request of the user for additional information is received;
   searching additional information corresponding to the request of the user on the determined object;
   receiving, when the additional information corresponding to the request of the user is not found, the additional information corresponding to the request of the user and control information related to the additional information from a server;
   controlling a light emission of at least one LED corresponding to an area on the display unit where the determined object is located among a plurality of LEDs within the LED backlight unit based on the control information; and
   transmitting, to the electronic device of the user, the received additional information corresponding to the request of the user through the at least one LED.

2. The method of claim 1, wherein the request for the additional information corresponding to the request of the user is received from at least one electronic device of the user performing visible light communication with the information display device.

3. The method of claim 1, further comprising:
   if the additional information corresponding to the request of the user is searched, transmitting, to the electronic device of the user, the searched additional information through the LED of the area where the determined object is located among a plurality of LEDs within the LED backlight unit.

4. The method of claim 1, wherein the additional information corresponding to the request of the user includes at least one of a version of the additional information corresponding to the request of the user, whether a number of pieces of additional information is plural, an additional information list, and a position to which the additional information corresponding to the request of the user is output.

5. The method of claim 1, further comprising:
   receiving content data from the server; and
   acquiring additional information of at least one object included in an image displayed on the information display device from the content data.

6. The method of claim 5, wherein the acquired additional information includes at least one of at least one object included in an image, an identifier of the object, a position of the object within the image to which the acquired additional information is output, detailed information on the object, and a version of the acquired additional information.

7. The method of claim 5, further comprising controlling, when a plurality of pieces of additional information are included in the content data, a light emission of at least one LED corresponding to a position to which each of the pieces of additional information is output.

8. The method of claim 5, further comprising controlling, when one additional information is included in the content data, light emissions of entire LEDs within the LED backlight unit.

9. The method of claim 1, wherein the object is one of a person, an item, an icon, a mark, and a symbol displayed in the image.

10. An information display device for visible light communication, the information display device comprising:
    a display unit configured to display an image including at least one object;
    an LED backlight unit including a plurality of LEDs located at a rear surface of the display unit;
    a backlight driver; and
    a controller configured to control to
    receive a request of a user for additional information input on the at least one object, wherein the LED backlight unit receives the input from an electronic device of the user,
    determine an object corresponding to an area on the display unit where the request of the user for the additional information is received,
    search additional information corresponding to the request of the user on the determined object,
    receive, when the additional information corresponding to the request of the user is not found, the additional information corresponding to the request of the user and control information related to the additional information from a server,
    control a light emission of at least one LED corresponding to an area on the display unit where the determined object is located among a plurality of LEDs within the LED backlight unit based on the control information, and
    transmit, to the electronic device of the user, the received additional information corresponding to the request of the user through the at least one LED.

11. The information display device of claim 10, wherein the additional information corresponding to the request of the user includes at least one of a version of the additional information corresponding to the request of the user, whether a number of pieces of additional information is plural, an additional information list, and a position to which the additional information corresponding to the request of the user is output.

12. The information display device of claim 10, wherein, when the number of pieces of additional information is plural, the backlight driver controls a light emission of at least one LED corresponding to a position to which each of the pieces of additional information is output.

13. The information display device of claim 10, wherein, when a number of pieces of additional information is one, the backlight driver controls light emissions of entire LEDs within the LED backlight unit.

14. The information display device of claim 10, further comprising a light receiving element configured to receive the request for the additional information corresponding to the request of the user in a form of a visible light from the electronic device of the user.

* * * * *